(12) United States Patent
Koba et al.

(10) Patent No.: US 9,413,041 B2
(45) Date of Patent: Aug. 9, 2016

(54) METHOD FOR ADJUSTING NICKEL-METAL HYDRIDE STORAGE BATTERY

(71) Applicants: PRIMEARTH EV ENERGY CO., LTD., Kosai-shi, Shizuoka (JP); TOYOTA JIDOSHA KABUSHIKI KAISHA, Toyota-shi, Aichi (JP)

(72) Inventors: Daisuke Koba, Toyohashi (JP); Sachio Takeda, Toyohashi (JP); Koichi Ichikawa, Kasugai (JP); Masahiko Mitsui, Toyota (JP); Yasuhiro Takahashi, Miyoshi (JP)

(73) Assignees: PRIMEARTH EV ENERGY CO., LTD., Kosai-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 255 days.

(21) Appl. No.: 14/171,125

(22) Filed: Feb. 3, 2014

(65) Prior Publication Data
US 2014/0285157 A1   Sep. 25, 2014

(30) Foreign Application Priority Data

Mar. 22, 2013  (JP) ................................ 2013-059749

(51) Int. Cl.
| | |
|---|---|
| *H02J 7/00* | (2006.01) |
| *H01M 10/44* | (2006.01) |
| *H01M 2/12* | (2006.01) |
| *H01M 10/34* | (2006.01) |

(52) U.S. Cl.
CPC ............ *H01M 10/44* (2013.01); *H01M 2/1229* (2013.01); *H01M 10/345* (2013.01); *H02J 7/0057* (2013.01); *Y02E 60/124* (2013.01)

(58) Field of Classification Search
USPC .................................................. 320/107, 137
See application file for complete search history.

(56) References Cited

U.S. PATENT DOCUMENTS

| | | | | |
|---|---|---|---|---|
| 6,281,663 B1* | 8/2001 | Yagi | ................... | B60L 11/1816 320/150 |
| 2002/0138971 A1* | 10/2002 | Onishi | ................ | H01M 2/0277 29/623.1 |
| 2003/0140483 A1* | 7/2003 | Wakabayashi | ........ | H01M 4/244 29/623.1 |
| 2004/0053114 A1* | 3/2004 | Furukawa | ............. | H01M 4/366 429/50 |
| 2004/0191619 A1* | 9/2004 | Komori | ............... | H01M 2/0262 429/176 |
| 2008/0096096 A1* | 4/2008 | Komori | ................... | H01M 2/12 429/56 |
| 2010/0264929 A1* | 10/2010 | Ugaji | ................. | G01R 31/3679 324/426 |

FOREIGN PATENT DOCUMENTS

| | | |
|---|---|---|
| JP | A-2008-235036 | 10/2008 |
| JP | A-2011-008963 | 1/2011 |

* cited by examiner

*Primary Examiner* — Brian Ngo
(74) *Attorney, Agent, or Firm* — Oliff PLC

(57) ABSTRACT

In a method for adjusting a nickel-metal hydride storage battery, based on a correlation between a charge amount after valve opening and an increased amount of a discharge reserve capacity which are previously ascertained, the charge amount after valve opening corresponding to a target value of the set increased amount of the discharge reserve capacity is calculated and this calculated value is set as a target charge amount after valve opening. In a discharge reserve adjusting step, when a charge amount of the battery from the time when a safety valve device is opened after start of overcharge of the battery reaches the set target charge amount after valve opening, overcharge of the battery is terminated.

3 Claims, 9 Drawing Sheets

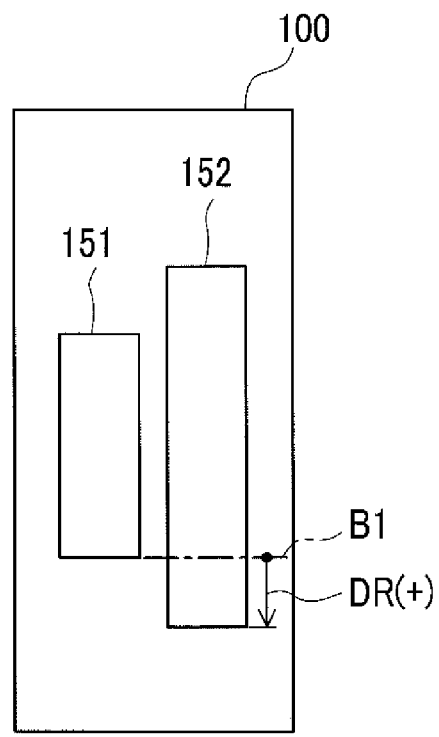
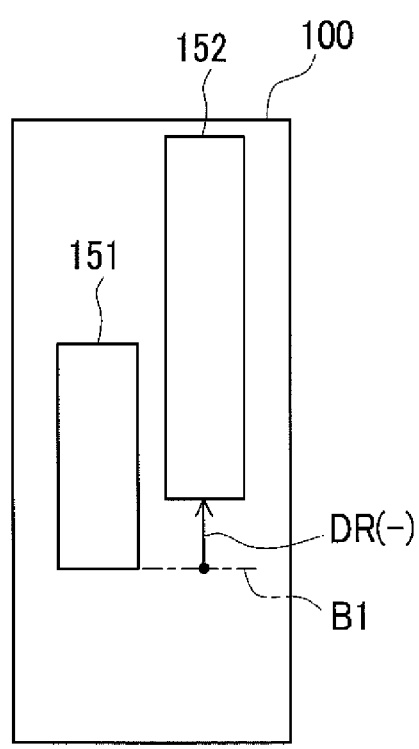

METHOD FOR ADJUSTING NICKEL-METAL HYDRIDE STORAGE BATTERY

CROSS-REFERENCE TO RELATED APPLICATIONS

This application is based upon and claims the benefit of priority from the prior Japanese Patent Application No. 2013-059749, filed Mar. 22, 2013, the entire contents of which are incorporated herein by reference.

BACKGROUND OF THE INVENTION

1. Field of the Invention

The present invention relates to a method for adjusting a nickel-metal hydride storage battery.

2. Related Art

In recent years, various types of nickel-metal hydride storage batteries have been used as power sources for portable devices or power sources for electric vehicles or hybrid electric vehicles. The nickel-metal hydride storage batteries are normally designed so that the capacity of a negative electrode is larger than the capacity of a positive electrode. Thus, the discharge capacity of the battery is limited by the positive electrode capacity (hereinafter, also referred to as "positive electrode regulation"). This positive electrode regulation makes it possible to suppress an increase in internal pressure of the battery during overcharge and overdischarge. From contrast between the negative electrode and the positive electrode, an excess uncharged portion available for charge is referred to as charge reserve, while an excess charged portion available for discharge is referred to as discharge reserve.

Meanwhile, it has been found from recent searches that, in some nickel-metal hydride storage batteries, a small amount of hydrogen gas continues to permeate through and leak out of a battery case. When hydrogen gas leaks to the outside in this way, hydrogen is released from the hydrogen absorbing alloy of the negative electrode according to a hydrogen leakage amount in order to keep balance of hydrogen partial pressure in the case. This decreases the discharge reserve of the negative electrode. Thus, hydrogen leakage advances very slowly and hence does not cause any problem in relatively short-term use.

However, in long-term use, the balance between the positive electrode capacity and the negative electrode capacity becomes lost and also the negative electrode capacity decreases, and the discharge reserve runs short. As a result, the nickel-metal hydride storage battery is subjected to the negative electrode regulation (meaning that the discharge capacity of the battery is limited by the negative electrode capacity). This results in a decrease in discharge capacity and a large deterioration in battery characteristics. When the nickel-metal hydride storage battery is to be used as a power source of an electric vehicle, hybrid electric vehicle, etc., a long-term service life is demanded. Thus, the above deterioration in battery characteristics would be problematic.

To solve the above problems, there is proposed a method for reproducing a nickel-metal hydride storage battery having a battery capacity decreased due to a decreased in discharge reserve (see Patent Document 1, for example). Patent Document 1 discloses a method including overcharging a nickel-metal hydride storage battery, releasing at least part of oxygen gas generated from a positive electrode to the outside of the battery, thereby increasing the discharge reserve capacity of a negative electrode.

RELATED ART DOCUMENTS

Patent Documents

Patent Document 1: JP-A-2008-235036

If a nickel-metal hydride storage battery is overcharged, electrons are emitted from a positive electrode and oxygen gas is generated by decomposition of electrolyte. In a negative electrode, on the other hand, hydrogen generated by decomposition of water is absorbed in hydrogen absorbing alloy. The oxygen gas generated from the positive electrode is usually consumed by reaction with the hydrogen absorbed in the hydrogen absorbing alloy (thus generating water), so that the internal pressure of the battery is prevented from rising.

In Patent Document 1, on the other hand, the nickel-metal hydride storage battery is overcharged to allow at least part of oxygen gas generated from the positive electrode to release to the outside of the nickel-metal hydride storage battery. Accordingly, in the battery, the hydrogen absorbed in the hydrogen absorbing alloy of the negative electrode in association with overcharge is excessively increased with respect to oxygen gas. Consequently, at least a part of hydrogen absorbed in the hydrogen absorbing alloy of the negative electrode by overcharge is left absorbed in the hydrogen absorbing alloy (this hydrogen forms the discharge reserve) without reaction with the generated oxygen gas. Patent Document 1 proposes increasing the discharge reserve capacity of the negative electrode as above.

In Patent Document, however, it is unclear how much the discharge reserve capacity of the negative electrode is increased by how much the nickel-metal hydride storage battery is overcharged. Thus, when the discharge reserve capacity is requested to be increased by a desired fixed capacity (a set target value), it is uncertain how much the nickel-metal hydride storage battery should be overcharged.

SUMMARY OF THE INVENTION

The present invention has been made in view of the above circumstances and to provide a method for adjusting a nickel-metal hydride storage battery to increase a discharge reserve capacity of a negative electrode by a desired fixed capacity (a set target value).

To achieve the purpose of the invention, there is provided a method for adjusting a nickel-metal hydride storage battery including a positive electrode, a negative electrode, and a safety valve device, the method including a discharge reserve adjusting step of overcharging the battery and releasing at least a part of oxygen gas generated from the positive electrode to outside of the battery through the safety valve device brought into an open state, to increase a discharge reserve capacity of the negative electrode, wherein a correlation between a charge amount after valve opening charged in the battery after the safety valve device is opened within a period of overcharge of the battery and an increased amount of the discharge reserve capacity is ascertained in advance, the method further includes: a step of setting a target value of the increased amount of the discharge reserve capacity; and a step of calculating the charge amount after valve opening corresponding to the set target value of the increased amount of the discharge reserve capacity based on the previously ascertained correlation between the charge amount after valve opening and the increased amount of the discharge reserve capacity, and setting a calculated value as the target charge amount after valve opening in the discharge reserve adjusting step, and the discharge reserve adjusting step includes terminating overcharge of the battery when the charge amount of the battery charged from the time when the safety valve device is opened after start of overcharge of the battery reaches the set target charge amount after valve opening.

In the above adjusting method, the correlation between the "charge amount after valve opening" and the increased amount of the discharge reserve capacity is ascertained in advance, the "charge amount after valve opening (i.e., a charge amount after valve opening which is a charge amount in the nickel-metal hydride storage battery from the time when the safety valve device is opened after the start of overcharging the battery)" representing a charge amount of the nickel-metal hydride storage battery charged after the safety valve device is opened within a period of overcharging the nickel-metal hydride storage battery.

As a result of searches by repeated experiments, the present inventors found there was a correlation between the increased amount of the discharge reserve capacity and the charge amount after valve opening. To be specific, the increased amount of the discharge reserve capacity is proportional to the charge amount after valve opening (the overcharge amount after valve opening). Accordingly, in the above adjusting method, a proportional relationship (a proportional formula and a regression line) between the charge amount after valve opening and the increased amount of the discharge reserve capacity is determined in advance.

The above adjusting method includes setting the target value of the increased amount of the discharge reserve capacity. Based on the correlation (a correlation chart and a correlation formula) between the charge amount after valve opening and the increased amount of the discharge reserve capacity previously ascertained, the charge amount after valve opening corresponding to the set target value (the increased amount of the discharge reserve capacity) is calculated, and this calculated value is set as the target charge amount after valve opening in the discharge reserve adjusting step.

Thereafter, in the discharge reserve adjusting step, the nickel-metal hydride storage battery is overcharged, releasing at least part of the oxygen gas generated from the positive electrode to the outside of the nickel-metal hydride storage battery through the safety valve device brought into the open state, thereby increasing the discharge reserve capacity of the negative electrode. Specifically, when the charge amount of the nickel-metal hydride storage battery from the time when the safety valve device is opened (that is, when outside releasing of the oxygen gas is enabled) after the start of overcharge of the nickel-metal hydride storage battery reaches the set target charge amount after valve opening, the overcharge of the nickel-metal hydride storage battery is terminated. Accordingly, the discharge reserve capacity can be increased by the increased amount of the discharge reserve capacity corresponding to the charge amount after valve opening in the above correlation.

As explained above, according to the above adjusting method, the discharge reserve capacity of the negative electrode can be increased by a desired constant capacity (a set target value) can be increased.

The safety valve device may include a safety valve device provided with a safety valve for keeping an air hole of a nickel-metal hydride storage battery in a sealed state while the internal pressure of the battery is less than a predetermined valve opening pressure, the safety valve being configured to automatically open the air hole from the sealed state when the internal pressure of the battery reaches the valve opening pressure, thereby releasing the gas out of the battery through the air hole.

Furthermore, the discharge reserve adjusting step may be arranged to overcharge the nickel-metal hydride storage battery to cause the internal pressure in the battery to reach the valve opening pressure, thereby automatically opening the safety valve device (automatically opening the air hole from the sealed state by the safety valve). Another alternative is to forcibly open the safety valve device during overcharge before the internal pressure of the battery reaches the valve opening pressure (to forcibly open the air hole from the sealed state by the safety valve). When the safety valve device is to be forcibly opened, it is preferable to open the safety valve device after the internal pressure of the battery exceeds outside air pressure (atmosphere pressure).

In the method for adjusting a nickel-metal hydride storage battery, preferably, the safety valve device includes a safety valve for keeping an air hole provided in the battery in a sealed state when an internal pressure of the battery is less than a predetermined valve opening pressure, the safety valve being configured to automatically open the air hole from the sealed state when the internal pressure of the battery reaches the valve opening pressure, to release gas in the battery to outside through the air hole, and the discharge reserve adjusting step includes terminating overcharge of the battery when a charge amount charged in the battery from the time when the safety valve automatically opens the air hole from the sealed state when the internal pressure of the battery reaches the valve opening pressure reaches the set target charge amount after valve opening.

In the above adjusting method, the discharge reserve adjusting step is arranged to terminate overcharging of the nickel-metal hydride storage battery when the charge amount of the nickel-metal hydride storage battery reaches the set target charge amount, the charge amount being counted from the time when the air hole is automatically opened from the sealed state by the safety valve when the internal pressure of the battery reaches a valve opening pressure after the start of overcharging the battery. According to this adjusting method, the discharge reserve capacity of the negative electrode can be increased easily and simply by a desired constant capacity (a set target value).

BRIEF DESCRIPTION OF THE DRAWINGS

FIG. 6 is an explanatory diagram showing one example of a negative electrode discharge reserve;

FIG. 7 is an explanatory diagram showing another example of the negative electrode discharge reserve;

DESCRIPTION OF EMBODIMENTS

Figure 1:
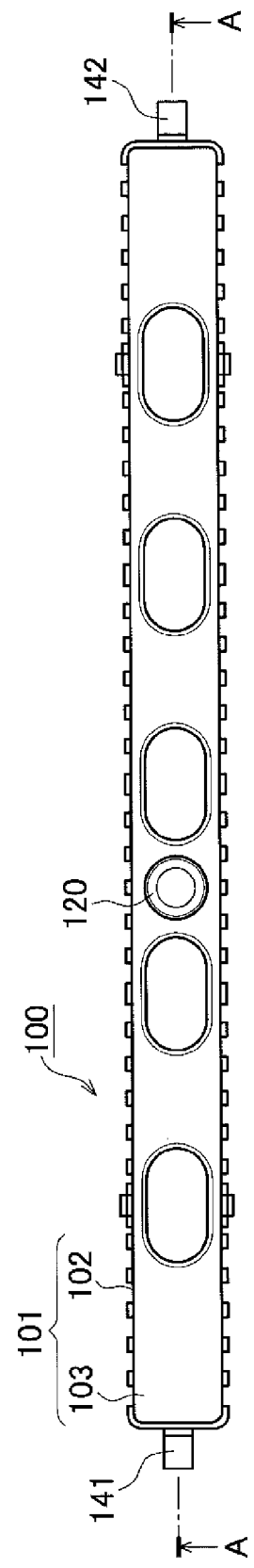
FIG. 1 is a top view of a nickel-metal hydride storage battery in an embodiment.
Figure 2:
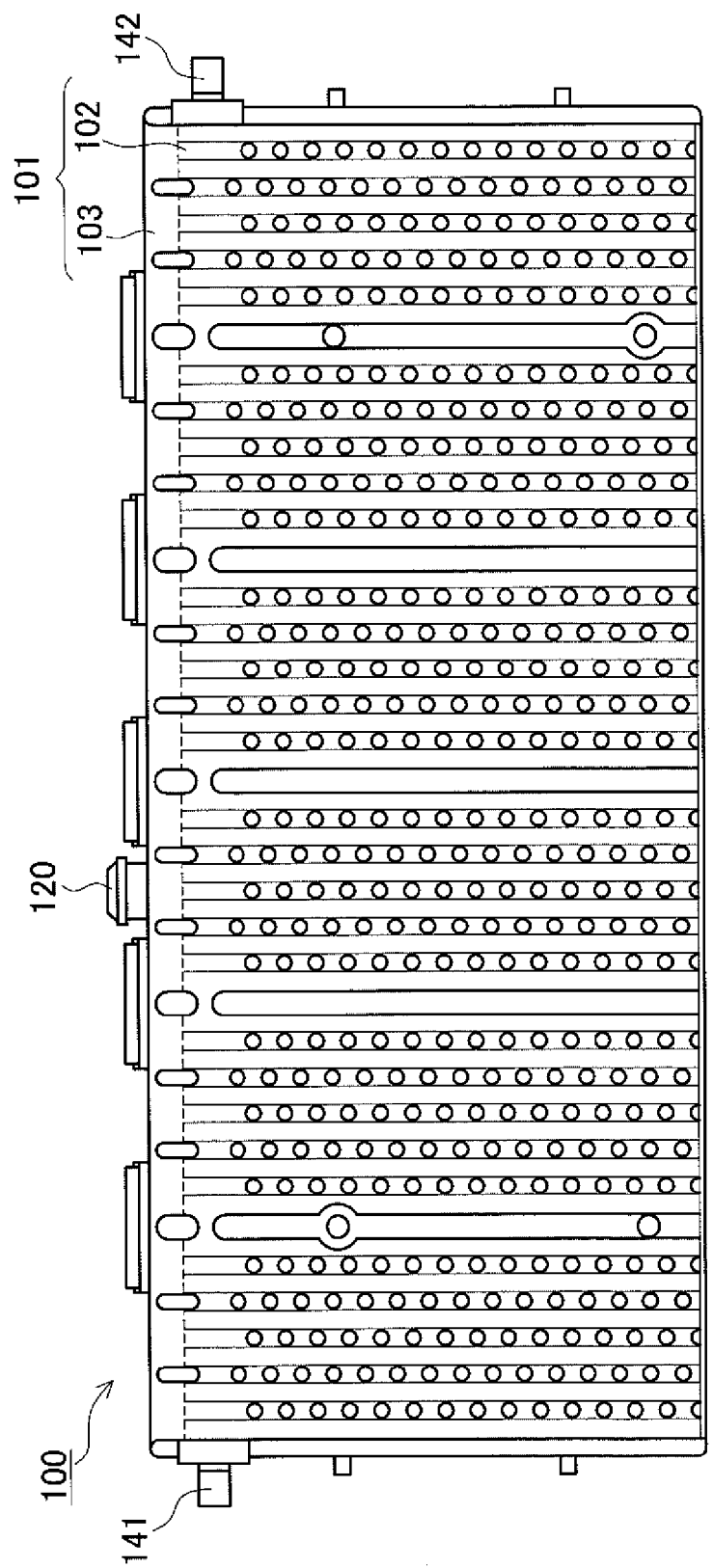
FIG. 2 is a side view of the nickel-metal hydride storage battery in the embodiment.

A detailed description of an embodiment of the present invention will now be given referring to the accompanying drawings. A nickel-metal hydride storage battery 100 in the present embodiment is first explained. This nickel-metal hydride storage battery (hereinafter, also simply referred to as a battery) 100 is a rectangular sealed nickel-metal hydride storage battery including a battery case 101 as shown in FIGS. 1 and 2. The battery case 101 has a battery housing 102 and a lid 103. This lid 103 is made of resin and has a substantially rectangular plate shape. This lid 103 is provided with a safety valve device 120. The battery housing 102 is made of resin and has a substantially rectangular box shape.

Figure 3:
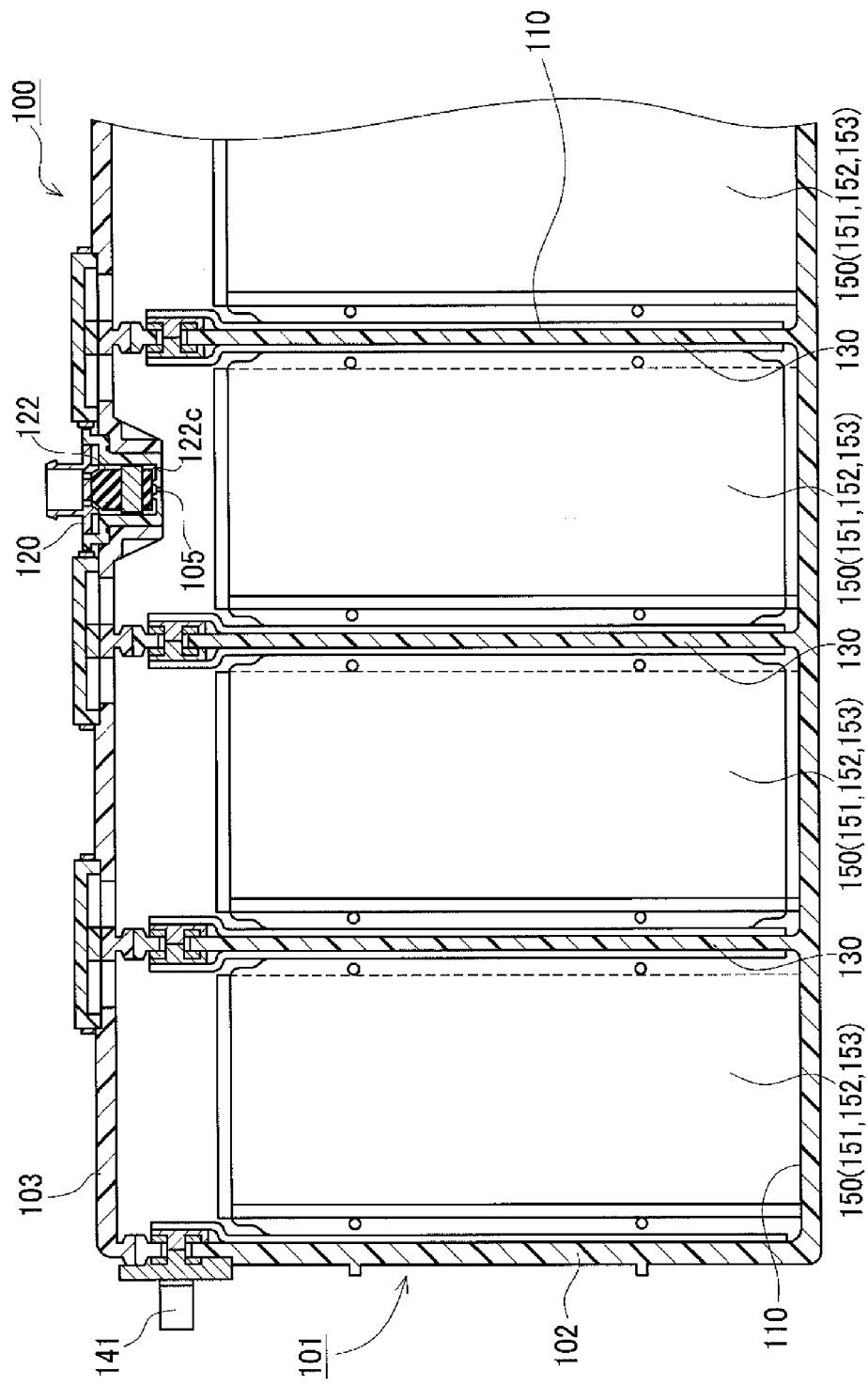
FIG. 3 is a cross sectional view taken along a line A-A in FIG. 1, showing the inside of the nickel-metal hydride storage battery.
Figure 4:
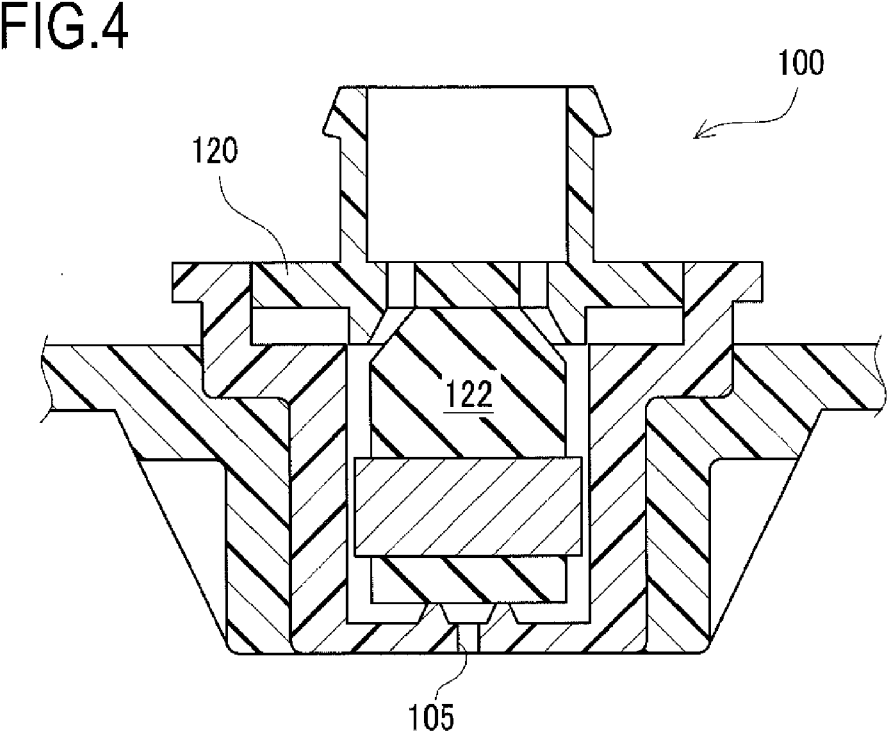
FIG. 4 is an enlarged cross sectional view of a safety valve device of the nickel-metal hydride storage battery in the embodiment.
Figure 5:
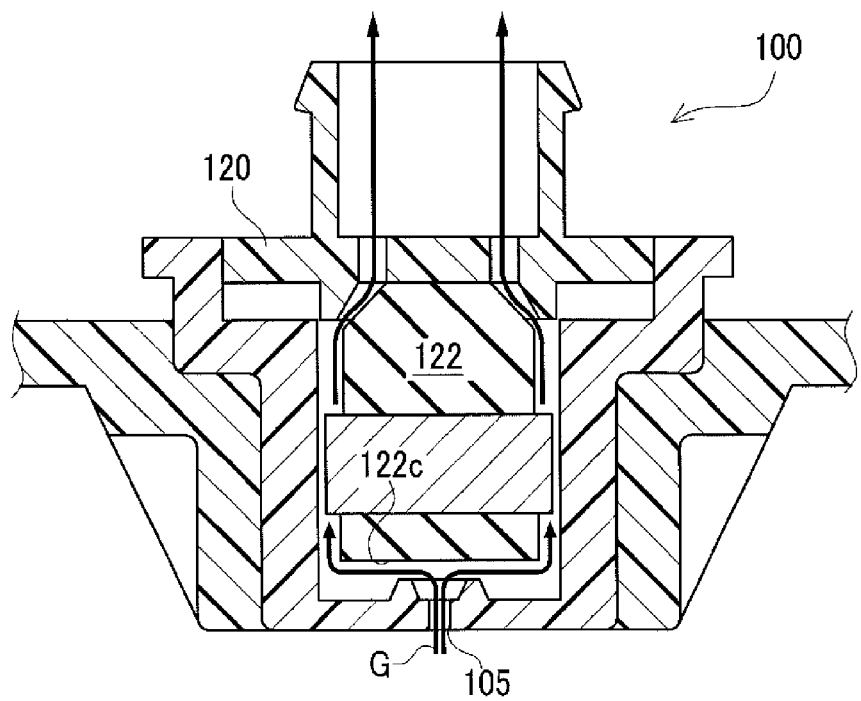
FIG. 5 is a view showing an open state of the safety valve device in the embodiment.

The safety valve device 120 includes a rubber safety valve 122 for sealing up an air hole 105 as shown in FIG. 3. This safety valve 122 keeps the air hole 105 in a sealed state as shown in FIG. 4 while the internal pressure in the battery 100 (the battery case 101) is lower than a predetermined valve opening pressure. On the other hand, when the internal pressure reaches the valve opening pressure, the safety valve 122 automatically opens the air hole 105 from the sealed state as shown in FIG. 5 to release gas G out of the battery 100 (the battery case 101) through the air hole 105. Specifically, when the internal pressure of the battery 100 reaches the valve opening pressure, a bottom 122c of the safety valve 122 is pushed up by the pressure, thereby opening the air hole 105 from the sealed state. This allows the gas G in the battery 100 to be released to the outside through the air hole 105.

The inside of the battery case 101 (the battery housing 102) is partitioned into six chambers by partition walls 130 as shown in FIG. 3. In each of the chambers, an electrode plate group 150 and an electrolyte (not shown) are contained. In the whole battery 100, therefore, six cells 110 are arranged. Each electrode plate group 150 includes positive electrodes 151, negative electrodes 152, and bag-shaped separators 153. The positive electrodes 151 are inserted one in each of the bag-shaped separators 153. The positive electrodes 151 inserted in the separators 153 and the negative electrodes 152 are alternately arranged in a stacking manner. The positive electrodes 151 and the negative electrodes 152 placed in each cell 110 are respectively current-collected and connected in series and also connected to a positive terminal 141 and a negative terminal 142.

Each positive electrode 151 may be formed for example of an electrode plate including an active material containing nickel hydroxide and an active material carrier such as foamed nickel. Each negative electrode 152 may be formed for example of an electrode plate containing hydrogen absorbing alloy as a negative electrode forming material. Each separator 153 may be formed for example of nonwoven fabric made of synthetic fibers subjected to a hydrophilic treatment. The electrolyte may include for example an alkali solution having a specific gravity of 1.2 to 1.4 and containing KOH.

The nickel-metal hydride storage battery 100 in the present embodiment is designed to have a positive electrode capacity of 6.5 Ah and a negative electrode capacity of 11 Ah. In the present embodiment, accordingly, the nickel-metal hydride storage battery 100 comes into the positive electrode regulation and hence the battery capacity is 6.5 Ah, that is, 100% SOC (State of Charge)=6.5 Ah.

<Measurement of Initial Value of Discharge Reserve Capacity>

A plurality of unused nickel-metal hydride storage batteries 100 were prepared and subjected to measurement of an initial value of the capacity of discharge reserve DR of the negative electrodes 152. To be concrete, each battery 100 was discharged until a battery voltage became 1 V per cell and then an electrolyte was added to each battery 100 so that the electrolyte be excessively present. In the electrolyte of each cell 110, thereafter, an Hg/HgO reference electrode not shown was put. Each cell 110 was excessively discharged while measuring the discharge capacity.

Here, the capacity of the discharge reserve DR is calculated by the following expression:

(Capacity of discharge reserve DR)=(Discharge capacity until an electric potential of the negative electrode 152 to an electric potential of the reference electrode becomes −0.7 V)−(Discharge capacity until an electric potential of the positive electrode 151 to the electric potential of the reference electrode becomes −0.5 V)

By the above measurement, the initial value of the discharge reserve DR of the negative electrode 152 in each cell 110 was about 2.5 Ah on average (see FIG. 6).

FIG. 6 is a schematic diagram showing a relationship between the capacity of the positive electrode 151 and the capacity of the negative electrode 152 in a battery 100 at an initial stage. In FIG. 6, the capacity of the positive electrode 151 and the capacity of the negative electrode 152 are respectively indicated by the length of a vertical band. In FIGS. 6 to 9, the capacity of the discharge reserve DR is indicated by an arrow assuming that a downward direction from a zero reference line B1 (a lower end of the positive electrode 151, i.e., a point corresponding to a completely discharged point of the positive electrode 151) is a plus direction and an upward direction from the same is a minus direction. When the capacity of the discharge reserve DR is a positive value, it is denoted as DR(+) (see FIG. 6). When this capacity is a negative value, it is denoted as DR(−) (see FIG. 7).

<Leaving Standing at High Temperature>

Next, a plurality of unused nickel-metal hydride storage batteries 100 were prepared and charged up to 60% SOC, and then left standing in a constant temperature chamber at 65° C. for six months. The temperature in the constant temperature chamber was set to a relatively high temperature, 65° C., in order to accelerate corrosion of the hydrogen absorbing alloy of the negative electrodes and also increase the hydrogen leakage amount. While the nickel-metal hydride storage batteries 100 were being left standing in the constant temperature chamber, the nickel-metal hydride storage batteries 100 were recharged to 60% SOC every one month to prevent deep discharge of each battery (to prevent deterioration due to decreasing of the battery voltage below 1 V).

Thereafter, those nickel-metal hydride storage batteries 100 were subjected to measurement of the capacity of the discharge reserve DR of each negative electrode 152 in the above manner. The capacity of the discharge reserve DR of the negative electrode 152 in each cell 110 was about −3.0 Ah on average as shown in FIG. 7. Specifically, by this leaving standing at high temperature, the discharge reserve DR became a minus capacity and the discharge capacity came to the negative electrode regulation.

<Negative Electrode Reserve Adjusting Test>

Eleven batteries 100 prepared by decreasing the discharge reserve DR in the above manner were subjected to a negative electrode reserve adjusting test to increase (restore) the discharge reserve DR. Specifically, each battery 100 was subjected to overcharge (charging was continued even after 100% SOC was reached) and the oxygen gas (at least a part thereof) generated from the positive electrodes 151 was released to the outside of each battery 100 through the corresponding safety valve device 120 brought into an open state, thereby increasing (restoring) the discharge reserve DR.

Meanwhile, when a nickel-metal hydride storage battery 100 is overcharged, the following reaction is brought about:

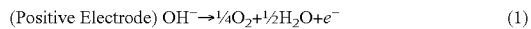
(Positive Electrode) $OH^- \rightarrow \frac{1}{4}O_2 + \frac{1}{2}H_2O + e^-$ (1)

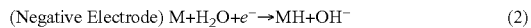
(Negative Electrode) $M + H_2O + e^- \rightarrow MH + OH^-$ (2)

$MH + \frac{1}{4}O_2 \rightarrow M + \frac{1}{2}H_2O$ (3)

Figure 8:
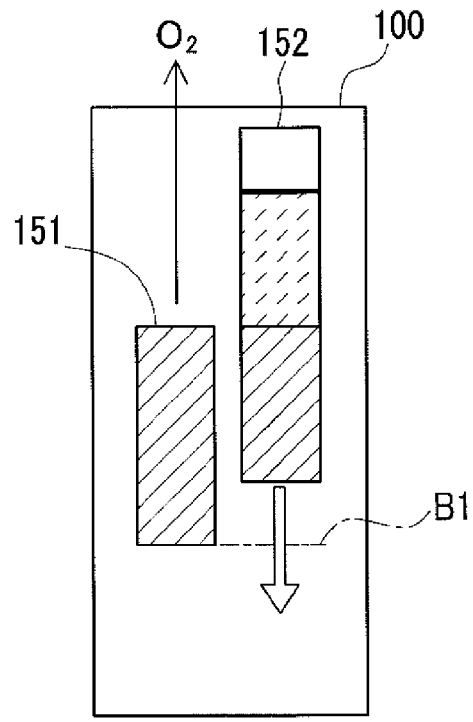
FIG. 8 is an explanatory diagram showing one example of a method for adjusting the negative electrode discharge reserve.
Figure 9:
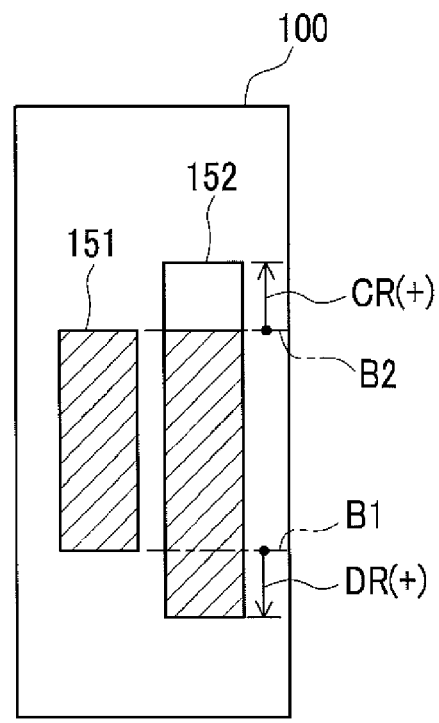
FIG. 9 is an explanatory diagram showing another example of the method for adjusting the negative electrode discharge reserve.

However, when oxygen gas $O_2$ (at least a part thereof) generated from the positive electrode 151 in the formula (1) is released out of the battery through the opened safety valve device 120, the reaction expressed by the formula (2) progresses in the negative electrode 152, absorbing hydrogen, while the reaction expressed by the formula (3) is restrained, suppressing release of hydrogen H. Accordingly, when the battery 100 is overcharged, as indicated by broken hatching lines in FIG. 8, the capacity of a charged part of the negative electrode 152 can be increased. This can increase the capacity of the discharge reserve DR of the negative electrode 152 (see FIG. 9). In FIGS. 8 and 9, the capacity of a charged part of each of the positive electrode 151 and the negative electrode 152 is indicated by oblique hatching lines.

FIG. 9 shows an example that the capacity of the discharge reserve DR is increased to a "positive value". The present invention is however not limited to such an example. According to the present invention, it is only necessary to perform a discharge reserve adjusting step to increase the capacity of the discharge reserve DR. This includes a case where the capacity of the discharge reserve DR after the discharge reserve adjusting step is performed becomes "0" or a "negative value".

In FIG. 9, the capacity of a charge reserve CR is indicated by arrows assuming that an upward direction from a zero reference line B2 (an upper end of the positive electrode 151, i.e., a point corresponding to a fully charged point of the positive electrode 151) is a plus direction and a downward direction from the same is a minus direction. In FIG. 9, the capacity of the charge reserve CR is a positive value, and thus this is expressed as CR(+).

Figure 13:
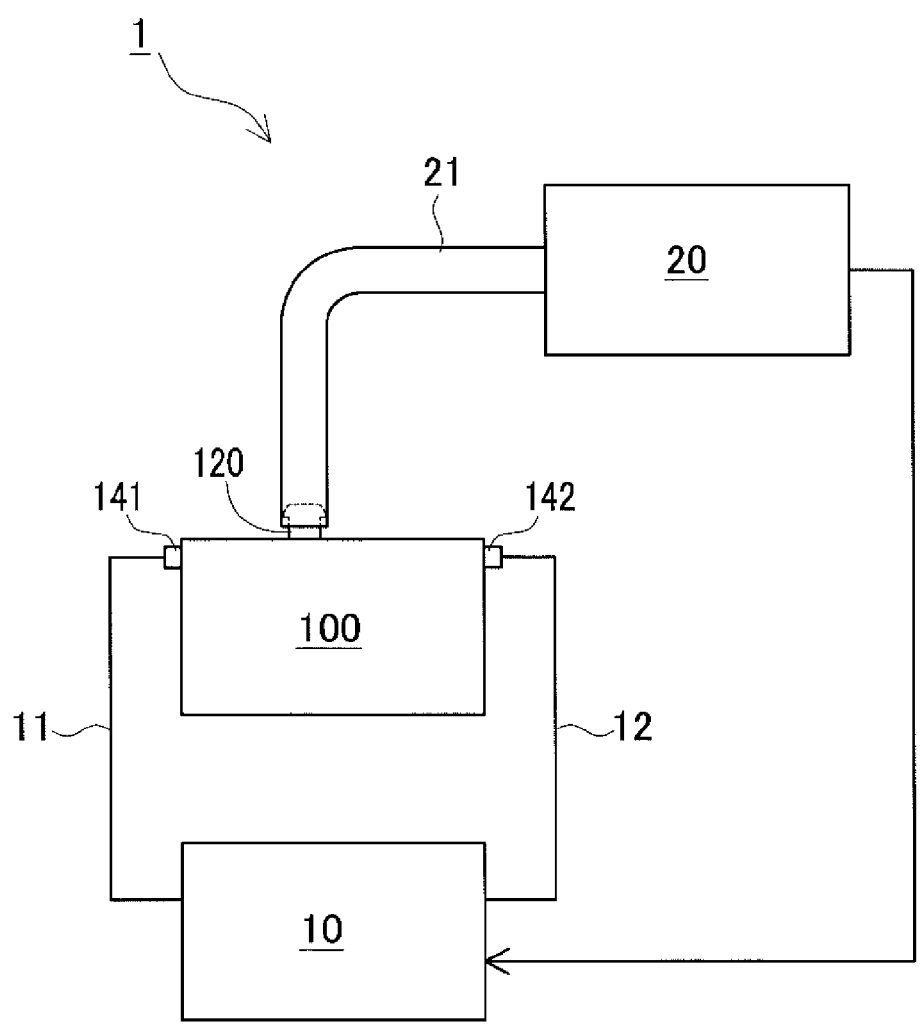
FIG. 13 is a schematic diagram of a discharge reserve adjusting device in the embodiment.

This test was performed using a discharge reserve adjusting device 1 shown in FIG. 13. This device 1 includes a charge and discharge device 10 and a gas flow meter 20. The charge and discharge device 10 is connected to the positive terminal 141 and the negative terminal 142 of the battery 100 through connecting cables 11 and 12. Accordingly, the battery 100 can be charged and discharged by the charge and discharge device 10. Furthermore, the safety valve device 120 of the battery 100 is connected to the gas flow meter 20 through a joining hose 21. Thus, the gas flow meter 20 can detect the gas released out of the battery 100 through the opened safety valve device 120. When the gas flow meter 20 detects an inflow of the gas thereto, it can be determined that the safety valve device 120 is opened.

The internal pressure of the battery 100 gradually rises in association with overcharge, and finally reaches the valve opening pressure. The safety valve device 120 has a function of releasing the gas out of the battery 100 through the air hole 105 by automatically moving the safety valve 122 to open the air hole 105 from the sealed state when the internal pressure of the battery 100 rises and reaches the valve opening pressure. This function is referred to as an automatic gas release function in the present application.

In the present test, therefore, by the automatic gas release function of the safety valve device 120 is utilized to release the oxygen gas (at least a part thereof) generated from the positive electrode 151 due to overcharge to the outside of the battery 100 through the air hole 105. Specifically, when the battery 100 is overcharged and the internal pressure of the battery 100 reaches the valve opening pressure, the safety valve device 120 is automatically opened (the air hole 105 sealed by the safety valve 122 is automatically opened).

In the present test, eleven batteries 100 were subjected to the discharge reserve adjusting treatment under various conditions. To be concrete, test environment temperatures were set to three different temperatures; 0° C., 25° C., and 30° C. Under the temperature environment of 0° C., three batteries 100 were charged (overcharged) at a constant current value of 20 A. Under the temperature environment of 25° C., seven batteries 100 were charged (overcharged) at a constant current value in a range of 2 A to 20 A. Under the temperature environment of 30° C., further, one battery 100 was charged (overcharged) at a constant current value of 20 A.

In the present test, furthermore, the batteries 100 were subjected to measurement of a charge amount charged in each battery 100 after the respective safety valve devices 120 are opened during overcharging the batteries 100. To be concrete, each of the batteries 100 was subjected to measurement of an electric quantity (Ah) charged to each battery 100 from the time when an inflow of gas was detected by the gas flow meter 20 (i.e., when the safety valve device 120 was opened) to the termination of charge. This measurement value is referred to as "charge amount after valve opening (an electric quantity of the battery 100 charged after the safety valve device 120 is opened within an overcharge period of the battery 100, namely, a charge amount in the battery 100 charged from the time when the safety valve device 120 is opened after the start of overcharging the battery 100)". The discharge reserve adjusting device 1 is configured so that when the gas flow meter 20 detects an inflow of gas, the information (signal) is transmitted to the charge and discharge device 10, and subsequent charge amounts are ascertained.

After the termination of charge (i.e., after completion of the discharge reserve adjusting treatment), each of the nickel-metal hydride storage batteries 100 was subjected to measurement of the capacity of the discharge reserve DR of the negative electrodes 152 in the above manner. An increased amount (Ah) of the discharge reserve capacity in the discharge reserve adjusting treatment was calculated by the following expression:

(Increased amount of discharge reserve capacity)= (Discharge reserve capacity after the discharge reserve adjusting treatment)−(Discharge reserve capacity before discharge reserve adjusting treatment)

Figure 12:
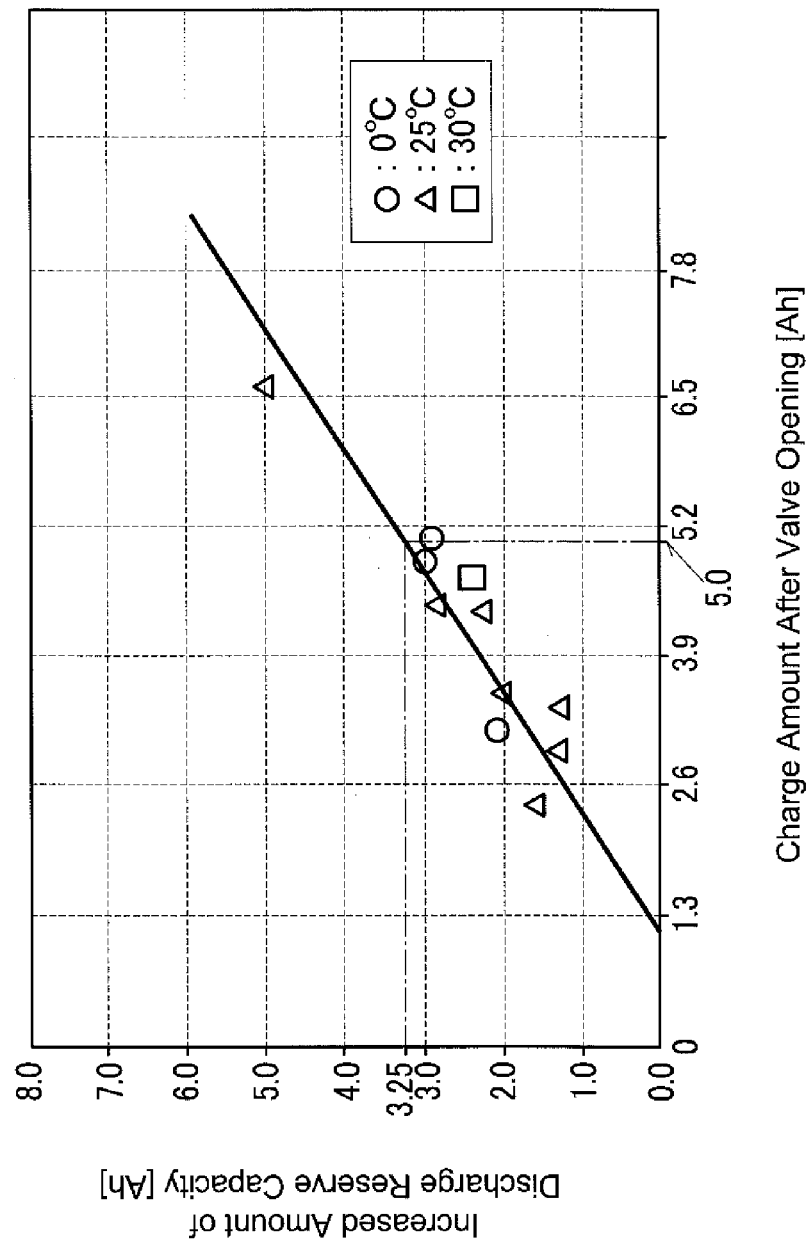
FIG. 12 is a graph showing results of a negative electrode reserve adjusting test, providing a correlation between a charge amount after valve opening and an increased amount of a discharge reserve capacity.

The results thereof are shown in FIG. 12 as the increased amount (Ah) of the discharge reserve capacity with respect to the charge amount after valve opening (Ah). FIG. 12 reveals that the increased amount of the discharge reserve capacity of the negative electrode is correlated (in a proportional relation) with the charge amount after valve opening of the batteries 100 charged after opening of the safety valve device 120 within the overcharge period of the battery 100.

In FIG. 12, results of the batteries 100 subjected to the adjusting treatment under the temperature environment of 0° C. are indicated by O (circular mark), results of the batteries 100 subjected to the adjusting treatment under the temperature environment of 25° C. are indicated by Δ (triangular mark), and results of the batteries 100 subjected to the adjusting treatment under the temperature environment of 30° C. are indicated by □ (square mark). As shown in FIG. 12, it is found that the "charge amount after valve opening" (Ah) and the increased amount (Ah) of the discharge reserve capacity are correlated in a proportional relationship irrespective of differences in temperature within the environmental temperature range of 0° to 30° C. When the obtained data was subjected to primary approximation by the method of least square, a correlation formula: $y=0.824x-0.87$ was obtained, wherein "y" represents the increased amount (Ah) of the discharge reserve capacity and "x" represents the charge amount after valve opening (Ah).

From the correlation between the charge amount after valve opening and the increased amount of the discharge reserve capacity shown in FIG. 12, it is found how much the increased amount (Ah) of the discharge reserve capacity is obtained depends on how much the charge amount after valve opening (Ah) of the battery 100 is determined. In other words, it is found how much the charge amount after valve opening (Ah) should be set in order to achieve a target value (Ah) of the increased amount of the discharge reserve capacity. For example, when the target value of the increased amount of the discharge reserve capacity is set to 3.25 Ah, the charge amount after valve opening has only to be set to 5.0 Ah.

Accordingly, the following manner can increase the discharge reserve capacity of the negative electrode by a desired constant capacity (a set target value). To be concrete, the target value of the increased amount of the discharge reserve capacity is set, for example, to 3.25 Ah. Successively, based on the previously ascertained correlation between the charge amount after valve opening and the increased amount of the discharge reserve capacity shown in FIG. 12, a charge amount after valve opening corresponding to the set target value of the increased amount of the discharge reserve capacity is calculated. For a target value of 3.25 Ah, the charge amount after valve opening is 5.0 Ah. This value is set as a target charge amount after valve opening in the discharge reserve adjusting step which will be mentioned later.

In the discharge reserve adjusting step, subsequently, charging (overcharging) of the battery 100 is started and then it is checked whether or not the safety valve device 120 is opened. When it is determined that the safety valve device 120 is opened, measurement of the charge amount of the battery 100 is started. Thereafter, when the charge amount of the battery 100 from the time when the safety valve device 120 is opened reaches the set target charge amount after valve opening (e.g., 5.0 Ah), charging (overcharge) of the battery 100 is terminated. Consequently, the discharge reserve capacity of the negative electrode can be increased by the set target value (e.g., 3.25 Ah).

<Method for Adjusting Nickel-Metal Hydride Storage Battery>

Next, a method for adjusting the nickel-metal hydride storage battery in the present embodiment will be explained. In the present embodiment, the correlation between the charge amount after valve opening and the increased amount of the discharge reserve capacity shown in FIG. 12 has been ascertained in advance.

Figure 10:
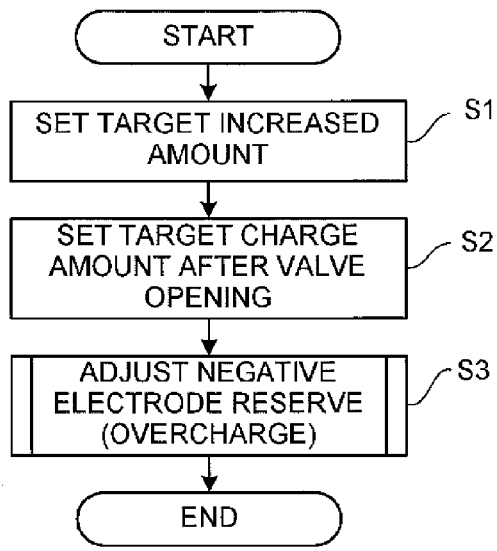
FIG. 10 is a flowchart of a main routine of the method for adjusting the nickel-metal hydride storage battery in the embodiment.

As shown in FIG. 10, in step S1, a target value of the increased amount (a target increased amount) of the discharge reserve capacity is set. For example, this target value is set to 3.25 Ah. In step S2, successively, the target charge amount after valve opening is set. To be concrete, based on the correlation between the charge amount after valve opening and the increased amount of the discharge reserve capacity which has been ascertained in advance (see FIG. 12), the charge amount after valve opening corresponding to the set target value of the increased amount of the discharge reserve capacity is calculated. In a case where the target value of the increased amount is set to 3.25 Ah, the charge amount after valve opening is calculated as 5.0 Ah (see FIG. 12). This calculated value is set to the target charge amount after valve opening in next step S3 (discharge reserve adjusting step).

In step S3, the discharge reserve adjusting (increasing) treatment is performed using the discharge reserve adjusting device 1 shown in FIG. 13. Specifically, the battery 100 having a decreased discharge reserve capacity is prepared and set in the discharge reserve adjusting device 1 (see FIG. 13). To be concrete, the positive terminal 141 and the negative terminal 142 of the battery 100 are connected to the charge and discharge device 10 through connecting cables 11 and 12. Furthermore, through the joining hose 21, the safety valve device 120 of the battery 100 is connected to the gas flow meter 20.

Figure 11:
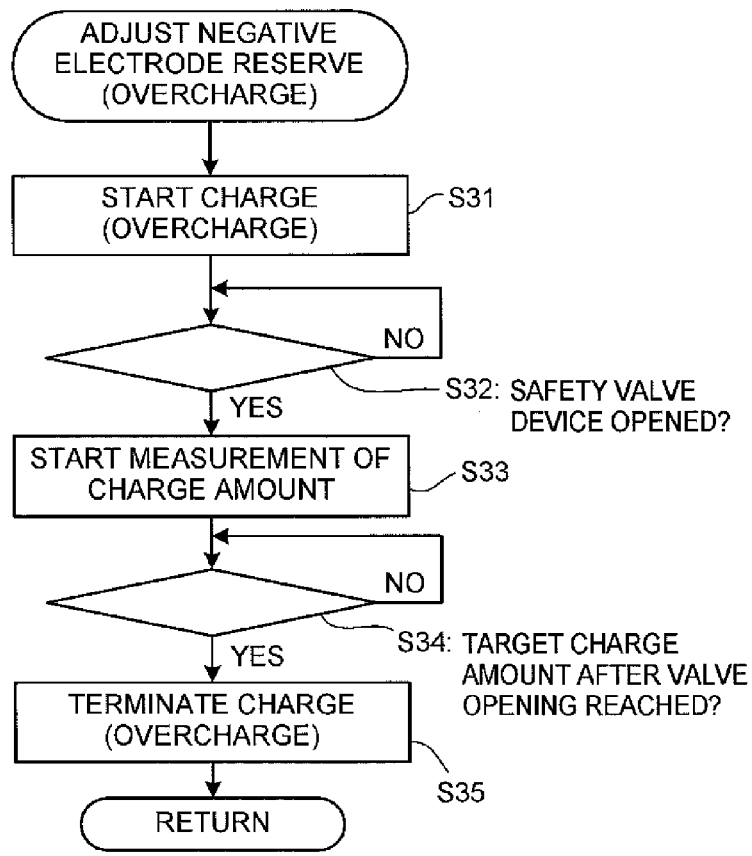
FIG. 11 is a flowchart of a sub routine of the method for adjusting the nickel-metal hydride storage battery in the embodiment.

Thereafter, as shown in FIG. 11, in step 31, the charge and discharge device 10 starts charging (overcharging) the battery 100. The flow advances to S32 where it is determined whether the safety valve device 120 is opened. In the present embodiment, when the gas flow meter 20 detects an inflow of gas thereto, the safety valve device 120 is determined to be open. When it is determined in step S32 that the safety valve device 120 is opened (S32: YES), the flow advances to step S33 where the charge amount of the battery 100 charged from the time when the safety valve device 120 was opened starts to be measured.

In the present embodiment, the automatic gas release function of the safety valve device 120 is utilized to release oxygen gas (at least a part thereof) generated from the positive electrode 151 by overcharge to the outside of the battery 100 through the air hole 105. Specifically, when the battery 100 is overcharged and the internal pressure of the battery 100 reaches the valve opening pressure, the safety valve device 120 is caused to automatically open; i.e., the air hole 105 sealed by the safety valve 122 is automatically opened. The gas released out of the battery 100 through the safety valve device 120 brought into the open state is allowed to flow in the gas flow meter 20 through the joining hose 21.

The discharge reserve adjusting device 1 in the present embodiment is configured such that when the gas flow meter 20 detects the inflow of gas, the information (signal) is transmitted to the charge and discharge device 10 and the subsequent charge amount can be ascertained. Accordingly, the processings in steps S32 and S33 are automatically performed in the discharge reserve adjusting device 1.

The flow then advances to step S34 where it is determined whether or not the charged amount charged in the battery 100 after the safety valve device 120 is opened reaches the target charge amount after valve opening. To be concrete, it is determined whether or not the charge amount of the battery 100 from the time when the safety valve device 120 was automatically opened (when the air hole 105 sealed by the safety valve 122 was automatically opened), that is, from the time when the gas flow meter 20 detected the inflow of gas, reaches the target charge amount after valve opening (e.g., 5.0 Ah). When it is determined that the target charge amount after valve opening is reached (S34: YES), charging (overcharging) of the battery 100 is stopped and a series of discharge reserve adjusting processings is terminated. Consequently, the discharge reserve capacity of the negative electrode 152 can be increased by the set target value (e.g., 3.25 Ah).

The present invention is explained in the above embodiment, but the invention is not limited to the above and may be embodied in other specific forms without departing from the spirit or essential characteristics thereof. For instance, the above embodiment shows the nickel-metal hydride storage battery 100 including the resin battery case is subjected to adjustment of the capacity of the discharge reserve DR. As an alternative, the adjusting method of the invention is also applicable to a nickel-metal hydride storage battery including a battery case made of any other materials.

| Reference Sings List | |
| --- | --- |
| 1 Discharge reserve adjusting device | 10 Charge and discharge device |
| 20 Gas flow meter | |
| 100 Nickel-metal hydride storage battery | |
| 101 Battery case | 105 Air hole |
| 120 Safety valve device | 122 Safety valve |
| 141 Positive terminal | 142 Negative terminal |
| 151 Positive electrode | 152 Negative electrode |
| CR Charge reserve | DR Discharge reserve |

The invention claimed is:

1. A method for adjusting a nickel-metal hydride storage battery including a positive electrode, a negative electrode, and a safety valve device, the method including:
    a step of setting a target value of an increased amount of a discharge reserve capacity of the negative electrode;
    a step of calculating a charge amount after valve opening corresponding to the set target value of the increased amount of the discharge reserve capacity based on a previously ascertained correlation between a charge amount after valve opening charged in the battery after the safety device is opened within a period of overcharge of the battery and the increased amount of the discharge reserve capacity, and setting a calculated value as the target charge amount after valve opening;
    a discharge reserve adjusting step of overcharging the battery and releasing at least a part of oxygen gas generated from the positive electrode to outside of the battery through the safety valve device brought into an open state, to increase the discharge reserve capacity of the negative electrode, and
    the discharge reserve adjusting step includes terminating overcharge of the battery when the charge amount of the battery charged from the time when the safety valve device is opened after start of overcharge of the battery reaches the set target charge amount after valve opening;
    wherein the battery is overcharged by subjecting the battery to continued charging after 100% SOC is reached.

2. The method for adjusting a nickel-metal hydride storage battery according to claim 1, wherein
    the safety valve device includes a safety valve for keeping an air hole provided in the battery in a sealed state when an internal pressure of the battery is less than a predetermined valve opening pressure, the safety valve being configured to automatically open the air hole from the sealed state when the internal pressure of the battery reaches the valve opening pressure, to release gas in the battery to outside of the battery.

3. The method for adjusting a nickel-metal hydride storage battery according to claim 1, wherein the correlation between the charge amount after valve opening and the increased amount of the discharge reserve capacity is represented by the formula $y=0.824x-0.87$, in which y represents the increased amount of the discharge reserve capacity and x represents the charge amount after valve opening.

* * * * *